March 26, 1929.   W. KIMBEL   1,706,694
VENTILATING ARRANGEMENT FOR VEHICLES
Filed Feb. 24, 1928
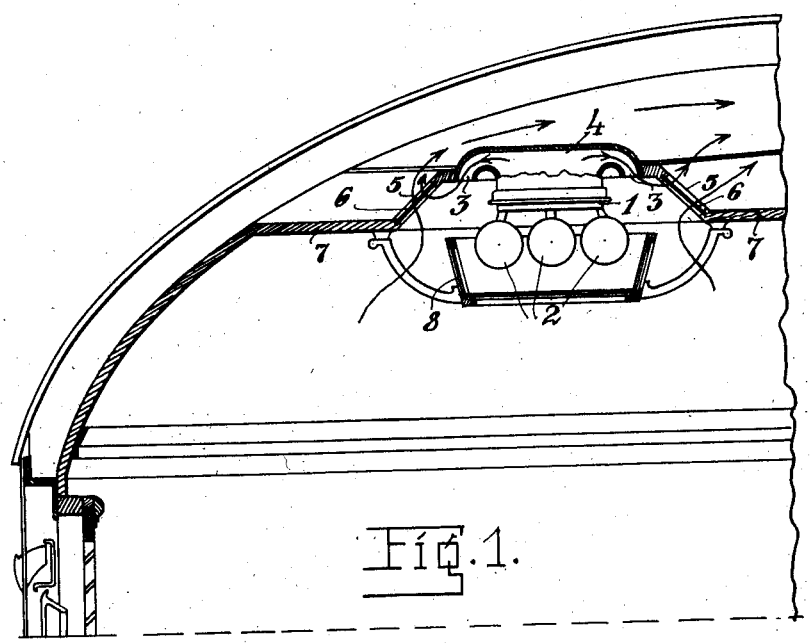
Fig.1.
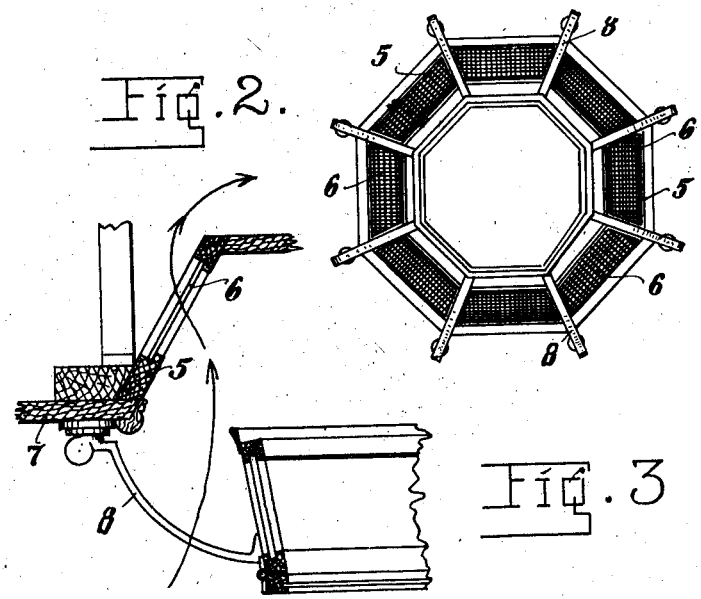
Fig.2.
Fig.3
INVENTOR
WILHELM KIMBEL
ATTORNEY Patented Mar. 26, 1929.

1,706,694

UNITED STATES PATENT OFFICE.

WILHELM KIMBEL, OF BERLIN, GERMANY.

VENTILATING ARRANGEMENT FOR VEHICLES.

Application filed February 24, 1928, Serial No. 256,708, and in Germany July 29, 1926.

This invention relates to the ventilation of vehicles particularly railway cars. Difficulties of ventilation of closed spaces in vehicles due substantially to want of space, are known. Up to the present, flaps that could be closed have been arranged for the purpose in question for instance at two opposite sides of a compartment, close to the roof, after it had been found that no satisfactory result could be obtained with a single flap. The arrangement of several ventilating flaps or registers within a relatively small space in vehicles is a drawback, more particularly because it is impossible to avoid unpleasant drafts in the compartment when both flaps are opened. Experience shows also that the portion of the space which is situated above the flap and is mostly arched, is not ventilated as merely eddies are formed there. It is just the ventilation of this portion however that is required for hygienic reasons, as the used up and heated air collects there, and moreover air unsuitable for breathing is also constantly produced by some of the existing means of artificial illumination.

The roof space is, as a rule, dimensioned so sparingly that simultaneous use of an illuminating element and of a ventilation arrangement is impossible. The object of this invention is to avoid all these difficulties.

According to the invention, the ventilation is effected in such a manner that round the lamp used for the illumination, are provided ventilation openings through which passes the air of the car heated by the lamps, and owing to the heating this air is supplied with accelerated speed to the outlet openings provided in the roof of the car.

To that end, the support of the source of light is made in the form of a hollow body, the openings of which open exclusively into the space to be lighted, and the support thus shaped is supported by a niche-like enclosure which contains passage openings through which the waste air can escape, or also fresh air can be introduced.

The invention will now be described with reference to the accompanying drawing which shows one example of a construction according to the invention, and it is to be understood that the invention is not limited to the constructional details shown. In said drawing:—

Figure 1 shows the arrangement of the lighting element drawn partly in central section, in a highly-arched railway compartment.

Figure 2 is a plan view of the lighting element of Figure 1, and

Figure 3 is a partial section on a larger scale through the lighting element of Figure 1.

The support 1 of the sources of light—electric incandescent lamps—in the construction illustrated is formed into a hollow body. It is open in the central portion towards the lamp holders and provided with further openings 3 which also open into the interior of the compartment to be lighted, whilst it is completely closed outwards by the rear wall 4. This support 1 is supported by a niche-like enclosure member which, in the construction illustrated, is octagonal, and the trapeze or lozenege-shaped lateral surfaces of which are set at an angle to the vertical in such a manner that the inside width of the said enclosure increases in the direction towards the interior of the compartment. The trapeze-shaped lateral portions 5 contain mesh screens 6 which afford a free passage to the air and other gases; they rest with their bottom edge on the roof frame 7 to which is secured by means of arms 8 the holder for the lamp shade.

The lighting device according to the invention ensures in a reliable manner a continuous ventilation of the interior of the compartment. The ventilation can take place in such a manner that the used-up air will continually escape outwards, namely at the highest point of the space to be ventilated, or fresh air could also be introduced under pressure from the outside for the purpose in question, without disturbing by-effects being caused as in the case of a large number of ventilation flaps.

The draught caused by car movement, is not transmitted to the interior of the compartment, and the device according to the invention acts independently of the direction of the wind, whilst on the contrary the former devices were dependent on it to a substantial degree. As a rule, the waste air escapes constantly in the direction of the arrows shown, compare more particularly Figure 3. This escape is still further assisted when the lighting lamps are switched on, owing to the latter producing a current of heated air which also escapes through the screens 6 into the space above the roof compartment, and thence into the open atmosphere. The device illustrated exhausts in a positive manner, also from the interior of the lamp support, the used-up warm air collecting there, as indicated by the arrows in Figure 1. When the lamps are burning, the whole device acts like a chimney and produces, with an exceedingly limited space requirement, a ventilation sufficient for any working conditions. Another particular advantage of the lighting device according to the invention consists in the size of the lighting arrangement proper with its supporting frame, remaining unaffected by the enclosure producing the ventilation, so that with the same utilization of space, a roof lamp can be made considerably larger than in former arrangements with several ventilation flaps.

What I claim and desire to secure by Letters Patent of the United States is:—

1. In a ventilating and lighting arrangement for vehicles, a hollow light support having a ring for supporting the lights, a cover above the ring, and an air passage between said ring and said cover, and an annular member surrounding said light support, said annular member having apertures for the passage of air therethrough.

2. In a ventilating and lighting arrangement for vehicles, a hollow light support having a ring for supporting the lights, a cover above the ring, and an air passage between said ring and said cover, and an annular member surrounding said light support, said annular member having apertures for the passage of air therethrough, the top of said annular member sustaining said light support and being laterally spaced from said light support so as to provide a direct air passage from the interior of the car through said ring, between said ring and said annular member, and through said apertures in said annular member to the exterior of the car.

3. In a ventilating and lighting arrangement for vehicles, a hollow light support having a ring for supporting the lights, a cover above the ring, and an air passage between said ring and said cover, an annular member surrounding said light support, said annular member having apertures for the passage of air therethrough, and brace members below said annular member and said light support, said brace members being adapted to support a shade and being spaced apart so as to permit the passage of air therebetween.

WILHELM KIMBEL.